United States Patent Office 3,079,390
Patented Feb. 26, 1963

3,079,390
N-SUBSTITUTED 3-AMINO-1,2,4-BENZOTRI-
AZINE-1-OXIDES
James Jiu, Morton Grove, and George P. Mueller, Park
Ridge, Ill., assignors to G. D. Searle & Co., Chicago,
Ill., a corporation of Delaware
No Drawing. Filed Dec. 12, 1958, Ser. No. 779,854
6 Claims. (Cl. 260—249.5)

This invention relates to N-substituted 3-amino-1,2,4-benzotriazine-1-oxides in which the 3-substituent is the residue of a primary or secondary amine. Typical amines which may be utilized are β-phenylethylamine; furfurylamine; hexamethyleneimine; 1,2,3,4 - tetrahydroisoquinoline; β-methyl-β-hydroxypropylamine; morpholine; β-hydroxyethylamine; piperidine; β-methyl-β-amino-α,γ-propanediol; thiosemicarbazide; ketopiperazine; and N-methylglucamine.

The compounds of the present invention are obtained by condensing 3-chloro-1,2,4-benzotriazine-1-oxide with the appropriate primary or secondary amine and isolating the product. For example, treating 3-chloro-1,2,4-benzotriazine-1-oxide with thiosemicarbazide and isolating the product affords 3-thiosemicarbazido-1,2,4-benzotriazine-1-oxide.

The compounds of the present invention possess valuable pharmacological properties. Especially, the subject compositions are distinguished by an exceptional inhibitory effect on the heat, swelling, redness, and granuloma formation characteristic of the inflammatory response to tissue injury.

The invention will appear more fully from the examples which follow. These examples are set forth by way of illustration only and it will be understood that the invention is not to be construed as limited in spirit or in scope by the details contained therein as many modifications in materials and methods will be apparent in this disclosure to those skilled in the art. In these examples temperatures are given in degrees centigrade (° C.). Quantities of materials are given in parts by weight unless otherwise noted.

EXAMPLE 1

3-(β-Phenylethylamino)-1,2,4-benzotriazine-1-oxide

A solution of 1 part of 3-chloro-1,2,4-benzotriazine-1-oxide and 1.9 parts of β-phenylethylamine in 50 parts of n-butanol is heated at reflux for 2 hours. The crystals obtained by cooling the reaction mixture are recrystallized from ethanol to yield 3-(β-phenylethylamino)-1,2,4-benzotriazine-1-oxide, M.P. about 193–195°.

EXAMPLE 2

3-Furfurylamino-1,2,4-benzotriazine-1-oxide

A solution of 1.5 parts of 3-chloro-1,2,4-benzotriazine-1-oxide and 3 parts of furfurylamine in 55 parts of n-butanol is heated at reflux for 2 hours. The mixture is evaporated to dryness in vacuo and the residue dissolved in a mixture of chloroform and water. After separation of the layers, the aqueous solution is extracted with chloroform and the organic layers combined. The chloroform solution is washed with water then dried over anhydrous sodium sulfate and evaporated to dryness in vacuo. Recrystallization of the residue from methanol yields 3-furfurylamino-1,2,4-benzotriazine - 1 - oxide, M.P. about 172–178°.

EXAMPLE 3

3-Hexamethyleneimino-1,2,4-benzotriazine-1-oxide

A solution of 1 part of 3-chloro 1,2,4-benzotriazine-1-oxide and 1.7 parts of hexamethyleneimine in 40 parts of n-butanol is heated at reflux for 2 hours. The solution is evaporated to dryness in vacuo and the residue dissolved in a mixture of chloroform and water. The water layer is extracted again with chloroform and the organic extracts combined. The chloroform solution is washed with water, dried over anhydrous sodium sulfate, evaporated to dryness in vacuo and the residue recrystallized from hexane to afford 3-hexamethyleneimino-1,2,4-benzotriazine-1-oxide, M.P. about 121–122.5°.

EXAMPLE 4

3-(1',2',3',4'-Tetrahydroisoquinolino)-1,2,4-
benzotriazine-1-oxide

To a suspension of 2 parts of 3-chloro-1,2,4-benzotriazine-1-oxide in 100 parts of n-butanol is added 5 parts of 1,2,3,4-tetrahydroisoquinoline and the mixture heated at reflux for 3½ hours. The solution is evaporated to dryness in vacuo and the residue dissolved in a mixture of chloroform and water. The aqueous layer is further extracted with chloroform and the extracts combined and washed with water. Drying of the combined extracts over anhydrous sodium sulfate followed by evaporation of the solvent in vacuo results in a residue which is recrystallized from ethanol producing 3-(1',2',3',4'-tetrahydroisoquinolino) - 1,2,4 - benzotriazine - 1 - oxide, M.P. about 125–126°.

EXAMPLE 5

3-(β-Methyl-β-hydroxypropylamino)-1,2,4-
benzotriazine-1-oxide

A solution of 2 parts of 3-chloro-1,2,4-benzotriazine-1-oxide and 5 parts of β-methyl-β-hydroxypropylamine in 100 parts of n-butanol is heated at reflux for 2 hours. The volatile material is distilled in vacuo and the residue taken up in chloroform and water. The aqueous layer is further extracted with chloroform and the combined chloroform extracts washed with water; then dried over anhydrous sodium sulfate. Evaporation of the solvent in vacuo leaves a residue which is recrystallized from benzene to afford 3-(β-methyl-β-hydroxypropylamino)-1,2,4-benzotriazine-1-oxide, M.P. about 159–160°.

EXAMPLE 6

3-Morpholino-1,2,4-benzotriazine-1-oxide

A solution of 1 part of 3-chloro-1,2,4-benzotriazine-1-oxide and 5 parts of morpholine in 35 parts of n-butanol is heated at reflux for 2 hours. The reaction mixture is concentrated in vacuo to a small volume, then chloroform and water added. The aqueous layer is separated and extracted again with chloroform. The combined chloroform extracts are washed with water, dried over anhydrous sodium sulfate, and evaporated to dryness in vacuo yielding a residue which is recrystallized from methanol to produce 3-morpholino-1,2,4-benzotriazine-1-oxide, M.P. about 174–176°.

EXAMPLE 7

3-(β-Hydroxyethylamino)-1,2,4-benzotriazine-1-oxide

To a suspension of 2 parts of 3-chloro-1,2,4-benzotriazine-1-oxide in 100 parts of n-butanol is added 2 parts of β-hydroxyethylamine and the mixture heated at reflux for 3½ hours. The mixture is then evaporated to dryness in vacuo and the residue recrystallized from ethanol to yield 3-(β-hydroxyethylamino)-1,2,4-benzotriazine-1-oxide, M.P. about 114–116°.

EXAMPLE 8

3-Piperidine-1,2,4-benzotriazine-1-oxide

A solution of 1 part of 3-chloro-1,2,4-benzotriazine-1-oxide and 1.7 parts of piperidine in 40 parts of n-butanol is heated at reflux for 2 hours. The solution is evaporated to dryness in vacuo and the residue dissolved in a mixture of chloroform and water. The aqueous layer is separated and extracted with chloroform and the extracts combined and washed with water. The chloroform solution is dried over anhydrous sodium sulfate and evaporated to dryness in vacuo leaving an oily residue which is crystallized from hexane to produce 3-piperidino-1,2,4-benzotriazine-1-oxide, M.P. about 108–110°.

EXAMPLE 9

*3-[(α,α-Bishydroxymethyl)ethylamino]-1,2,4-benzotriazine-1-oxide*

A solution of 2 parts of 3-chloro-1,2,4-benzotriazine-1-oxide and 5 parts of β-amino-β-methyl-α,γ-propanediol in 100 parts of n-butanol is heated at reflux for 2 hours. Chloroform and water are added to the residue obtained after distillation of the solvent in vacuo. The layers are separated and the aqueous layer is extracted with chloroforms. The combined extracts are washed with water, dried over anhydrous sodium sulfate, and evaporated to dryness in vacuo. The oily residue is chromatographed on 75 parts of silica gel and the product isolated by elution with a 35% ethyl acetate-65% benzene (v./v.) solution. Recrystallization of the crude product from ethyl acetate affords 3-[(α,α-bishydroxymethyl)ethylamino]-1,2,4-benzotriazine-1-oxide, M.P. about 127–128°.

EXAMPLE 10

*3-Thiosemicarbazido-1,2,4-benzotriazine-1-oxide*

A mixture of 1 part of 3-chloro-1,2,4-benzotriazine-1-oxide and 1 part of thiosemicarbazide in 40 parts of n-butanol is heated at reflux for 2 hours. Cooling of the reaction mixture results in crystallization of the product which is then collected by filtration and recrystallized from aqueous dimethylformamide to yield 3-thiosemicarbazido-1,2,4-benzotriazine-1-oxide, M.P. about 253–255° (dec.).

EXAMPLE 11

*3-(3'-Ketopiperazino)-1,2,4-benzotriazine-1-oxide*

A solution of 7 parts of 3-chloro-1,2,4-benzotriazine-1-oxide and 5 parts of ketopiperazine in 160 parts of n-butanol is heated at reflux for 3 hours. The mixture is evaporated to dryness in vacuo and the residue dissolved in chloroform and water. The layers are separated and the aqueous layer extracted with chloroform. The combined extracts are washed with water, dried over anhydrous sodium sulfate, and evaporated to dryness in vacuo. Crystallization of the residue from either ethanol or hexane produces 3-(3'-ketopiperazino)-1,2,4-benzotriazine-1-oxide, M.P. about 254–257°.

EXAMPLE 12

*3-(N-Methylglucamino)-1,2,4-benzotriazine-1-oxide*

A suspension of 2 parts of 3-chloro-1,2,4-benzotriazine-1-oxide and 5 parts of N-methylglucamine in 100 parts of n-butanol is heated at reflux for 2 hours. The solution is evaporated to dryness in vacuo and the residue chromatographed on 110 parts of silica gel. Elution with acetone followed by crystallization from a small volume of methanol yields 3-(N-methylglucamino)-1,2,4-benzotriazine-1-oxide, M.P. about 135–137°.

What I claim is:
1. 3-Furfurylamino-1,2,4-benzotriazine-1-oxide of the formula

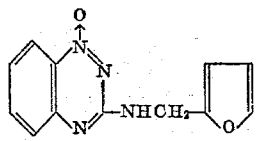

2. 3-(1',2',3',4'-tetrahydroisoquinolino)-1,2,4-benzotriazine-1-oxide of the formula

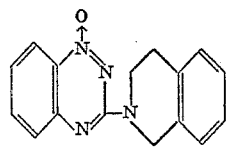

3. 3-[(α,α-bishydroxymethyl)ethylamino]-1,2,4-benzotriazine-1-oxide of the formula

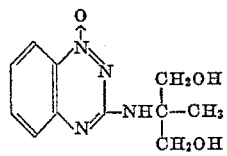

4. 3-thiosemicarbazido-1,2,4-benzotriazine-1-oxide of the formula

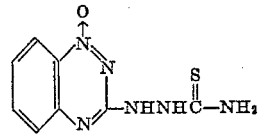

5. 3-(3'-ketopiperazino)-1,2,4-benzotriazine-1-oxide of the formula

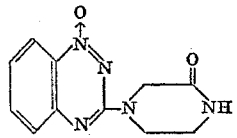

6. 3-(N-methylglucamino)-1,2,4-benzotriazine-1-oxide of the formula

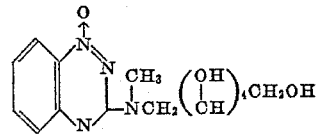

References Cited in the file of this patent
UNITED STATES PATENTS

| | | |
|---|---|---|
| 2,489,355 | Wolf et al. | Nov. 29, 1949 |
| 2,496,364 | Wolf et al. | Feb. 7, 1950 |
| 2,650,919 | Cusic | Sept. 1, 1953 |
| 2,676,971 | Cusic et al. | Apr. 27, 1954 |
| 2,911,406 | Mueller | Nov. 3, 1959 |
| 2,928,767 | Gulesich et al. | Mar. 15, 1960 |
| 2,966,487 | Jiu et al. | Dec. 27, 1960 |

OTHER REFERENCES

Arndt et al.: Deutsche Chemische Gesellshaft (Berichte), vol. 50 (II), pp. 1251 to 1252 and 1259 (1917).
Chem. Abs., vol. 42, cols. 4963 to 4964 (1948).
Wolf et al.: J. Am. Chem. Soc., vol. 76, pp. 3551 to 3553, 4611 to 4613 (1954).
Robbins et al.: Journ. of the Chem. Soc., 1957, pp. 3186 to 3194.